US012579672B2

(12) United States Patent
Ye et al.

(10) Patent No.: US 12,579,672 B2
(45) Date of Patent: Mar. 17, 2026

(54) STEREO VISION-BASED HEIGHT CLEARANCE DETECTION

(71) Applicant: Rivian IP Holdings, LLC, Irvine, CA (US)

(72) Inventors: Shangzhou Ye, Santa Clara, CA (US); Hui Zhou, Sunnyvale, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 361 days.

(21) Appl. No.: 18/346,139

(22) Filed: Jun. 30, 2023

(65) Prior Publication Data

US 2025/0005777 A1 Jan. 2, 2025

(51) Int. Cl.
| | |
|---|---|
| *G06T 7/593* | (2017.01) |
| *G06T 7/10* | (2017.01) |
| *G06V 20/56* | (2022.01) |

(52) U.S. Cl.
CPC ............... *G06T 7/593* (2017.01); *G06T 7/10* (2017.01); *G06V 20/56* (2022.01); *G06T 2207/10012* (2013.01); *G06T 2207/30261* (2013.01)

(58) Field of Classification Search
CPC . G06T 7/593; G06T 7/10; G06T 2207/10012; G06T 2207/30261; G06T 2207/10028; G06T 7/11; G06T 7/50; G06T 7/70; G06V 20/56; G06V 20/588; G06V 20/58; G01B 11/0608; G01B 11/14
See application file for complete search history.

(56) References Cited

U.S. PATENT DOCUMENTS

| | | | |
|---|---|---|---|
| 2023/0070221 A1* | 3/2023 | Shigemura | ............... G06T 7/60 |
| 2023/0351769 A1* | 11/2023 | Wu | ....................... G06V 10/762 |
| 2024/0303919 A1* | 9/2024 | Tananaev | ............... G06V 10/82 |

FOREIGN PATENT DOCUMENTS

CN 110619636 A * 12/2019 ............... G06T 7/11

OTHER PUBLICATIONS

Badino, et al., "Free Space Computation Using Stochastic Occupancy Grids and Dynamic Programming," 2007, retrieved from http://vision.jhu.edu/iccv2007-wdv/WDV07-badino.pdf, 12 pages.
Bogoslavskyi, et al., "Efficient Online Segmentation for Sparse 3D Laser Scans" PFG—Journal of Photogrammetry, Remote Sensing and Geoinformation Science, Feb. 2017, 15 pages.

(Continued)

*Primary Examiner* — Chan S Park
*Assistant Examiner* — Daniel C Chang
(74) *Attorney, Agent, or Firm* — BAKERHOSTETLER

(57) ABSTRACT

Aspects of the subject disclosure relate to stereo vision-based height clearance detection, of which a device includes a processor that obtains first data and second data from different cameras of a vehicle. The processor generates a depth map based on a disparity between the first data and the second data. The processor determines a road segmentation based at least in part on the depth map. The processor determines road surface height information for corresponding portions of the road segmentation. The processor determines a height estimation of a non-road object corresponding to at least one portion of the road segmentation. The processor provides an indication of a height clearance estimate for the at least one portion of the road segmentation based on the road surface height information and the height estimation of the non-road object.

20 Claims, 7 Drawing Sheets

(56) References Cited

OTHER PUBLICATIONS

Chen, et al., "Gaussian-process-based Real-time Ground Segmentation for Autonomous Land Vehicles," Journal of Intelligent & Robotic Systems 76 (2014), 25 pages.

Oniga, et al., "Processing Dense Stereo Data Using Elevation Maps: Road Surface, Traffic Isle and Obstacle Detection," IEEE Transactions on Vehicular Technology, Apr. 2010, 11 pages.

* cited by examiner

600

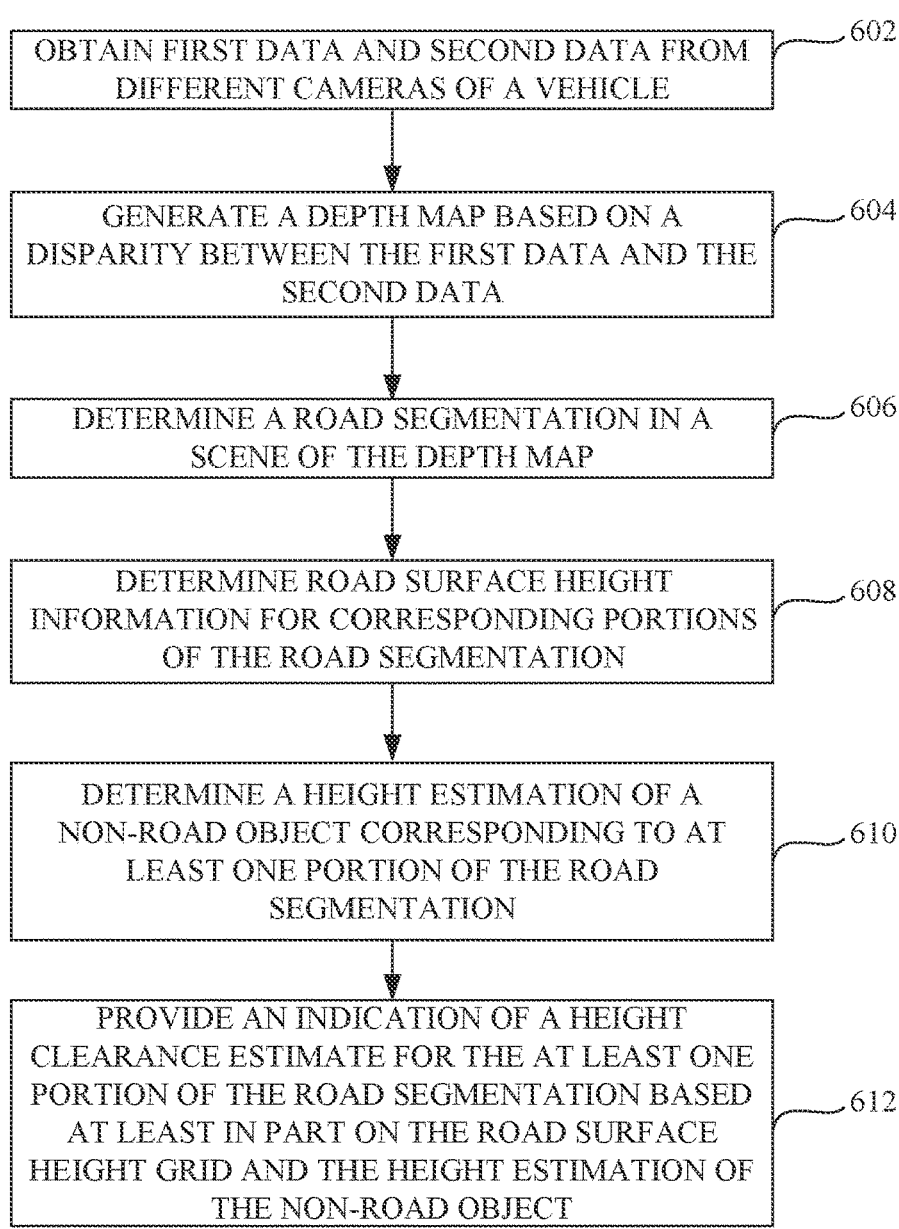

OBTAIN FIRST DATA AND SECOND DATA FROM DIFFERENT CAMERAS OF A VEHICLE ⟋602

GENERATE A DEPTH MAP BASED ON A DISPARITY BETWEEN THE FIRST DATA AND THE SECOND DATA ⟋604

DETERMINE A ROAD SEGMENTATION IN A SCENE OF THE DEPTH MAP ⟋606

DETERMINE ROAD SURFACE HEIGHT INFORMATION FOR CORRESPONDING PORTIONS OF THE ROAD SEGMENTATION ⟋608

DETERMINE A HEIGHT ESTIMATION OF A NON-ROAD OBJECT CORRESPONDING TO AT LEAST ONE PORTION OF THE ROAD SEGMENTATION ⟋610

PROVIDE AN INDICATION OF A HEIGHT CLEARANCE ESTIMATE FOR THE AT LEAST ONE PORTION OF THE ROAD SEGMENTATION BASED AT LEAST IN PART ON THE ROAD SURFACE HEIGHT GRID AND THE HEIGHT ESTIMATION OF THE NON-ROAD OBJECT ⟋612

*FIG. 6*

STEREO VISION-BASED HEIGHT CLEARANCE DETECTION

INTRODUCTION

Vehicles, including electric vehicles, can include camera systems. For example, a vehicle camera system can include strategically placed cameras on a vehicle for detecting obstacles in the surroundings of the vehicle.

SUMMARY

Camera systems can be used to detect obstacles or objects in front of (and/or behind) a vehicle to help prevent collisions or damage to the vehicle. These camera systems may use a combination of sensors and cameras to detect objects in the vehicle's path and provide visual and/or audible warnings to the driver. However, some traditional front height clearance warning systems may suffer from limited accuracy and/or robustness. For example, the accuracy of the front height clearance estimation can be limited by the quality of the sensor data and/or the robustness of the applied algorithms, which can lead to incorrect front height clearance values. Additionally, some traditional front height clearance warning systems may fail to detect overhead obstacles that are occluded, partially visible, and/or have complex shapes, and/or some traditional front height clearance warning systems may produce false positives due to noise, lighting conditions, and/or sensor failures.

The subject technology provides for a stereo vision-based front (and/or rear) height clearance detection system, where stereo images can be used for height clearance detection systems on vehicles. The subject system uses two or more cameras to capture images of the same scene from slightly different perspectives (e.g., stereo images), which allows for the creation of a three-dimensional (3D) depth map of the environment. In a stereo image system, the two cameras are mounted on the front (or any position facing in a direction that is selected suitable for the need of height clearance detection) of the vehicle, and their images are processed by, for example, an on-board processing unit to determine whether a vehicle can fit within a particular opening along a path of the vehicle. This can be done by analyzing the disparity between the two images, which is the difference in position of corresponding points (or image features) in the two images. The on-board processing unit can then use this information to create a 3D depth map of the environment, which can be used to detect any overhead obstacles and calculate the height clearance of the vehicle and provide visual and/or audible warnings to the driver.

In accordance with one or more aspects of the subject technology, a method includes obtaining, by a processor, first data and second data from different cameras of a vehicle respectively; generating a depth map based on a disparity between the first data and the second data; determining a road segmentation based at least in part on the depth map; determining road surface height information for corresponding portions of the road segmentation; determining a height estimation of a non-road object corresponding to at least one portion of the road segmentation; and providing an indication of a height clearance estimate for the at least one portion of the road segmentation based at least in part on the road surface height information and the height estimation of the non-road object.

In accordance with one or more aspects of the subject technology, a system is provided that includes memory and at least one processor coupled to the memory and configured to obtain first stereo image and second stereo image from different cameras of a vehicle respectively; generate a depth map based on a disparity between the first stereo image and the second stereo image; determine a road segmentation based at least in part on the depth map; generate a road surface height grid with each cell of the road surface height grid indicating road surface height information for a corresponding portion of the road segmentation; detect a non-road object in the depth map; segment the depth map into a plurality of stixel representations; classify the plurality of stixel representations into road stixel representations and non-road stixel representations; identify the non-road object as at least one of the non-road stixel representations in the depth map; determine a height estimation of the at least one of the non-road stixel representations corresponding to at least one portion of the road segmentation; and provide an indication of a height clearance estimate for the at least one portion of the road segmentation based at least in part on the road surface height information and the height estimation of the at least one of the non-road stixel representations.

In accordance with one or more aspects of the subject technology, a vehicle including a first camera and a second camera that also includes a processor configured to obtain stereo images from the first camera and the second camera; generate a depth map based on a disparity between the stereo images; generate an initial road segmentation by performing a gradient-based graph search on the depth map; generate a stereo depth error model to fit a refined quadratic road model to the initial road segmentation with a region-growing process driven by the stereo depth error model; determine a road surface height grid with each cell of the road surface height grid indicating road surface height information for a corresponding portion of the road segmentation; segment the depth map into stixel representations; and determine a height clearance based on the road surface height information using a probabilistic occupancy grid indicating one or more stixel representations representing an overhead obstacle from the stixel representations.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates a flow diagram of an example process for stereo vision-based height clearance detection on a vehicle in accordance with one or more implementations of the subject technology.

DETAILED DESCRIPTION

Figure 1:
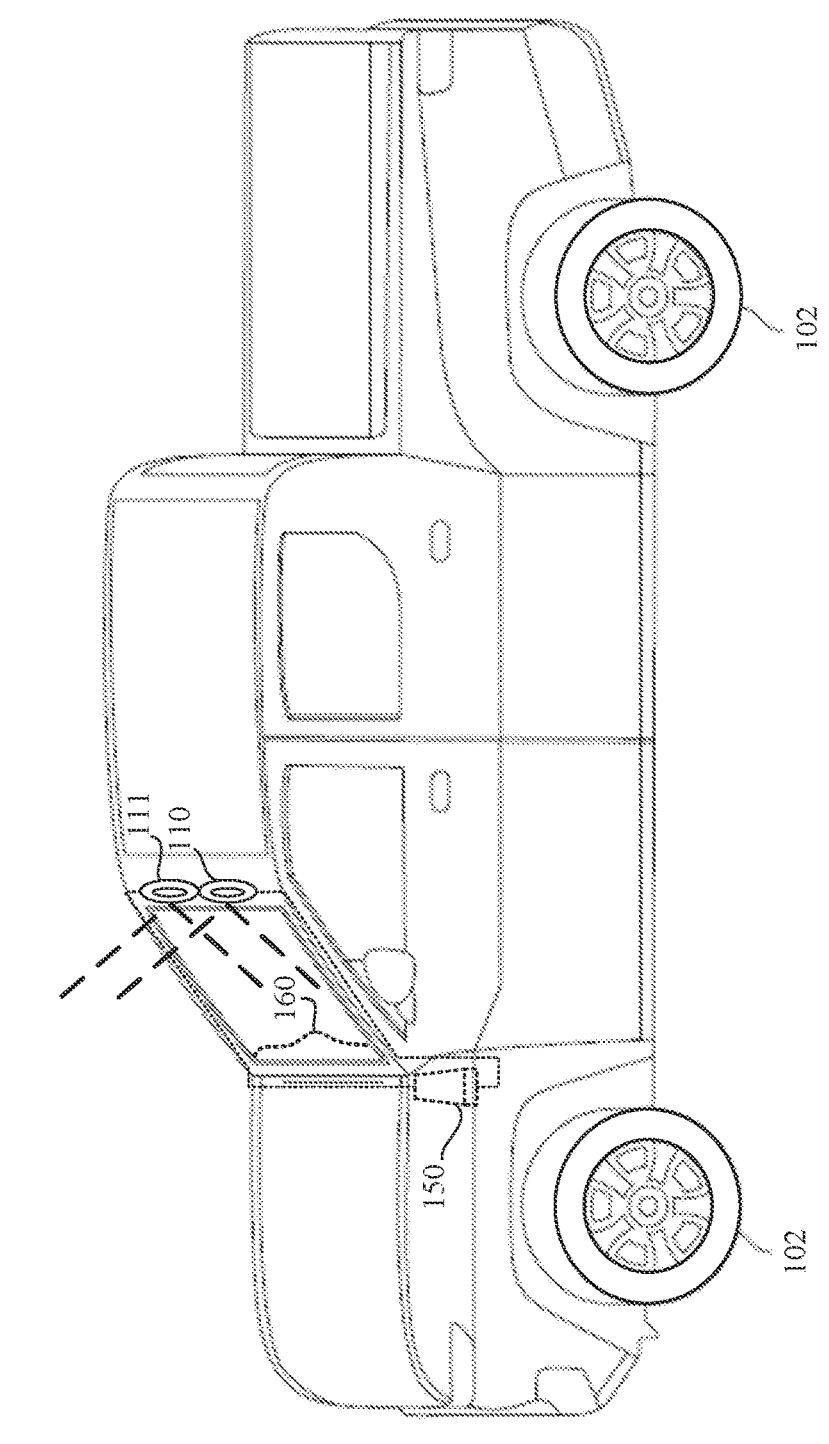
FIG. 1 illustrates a schematic perspective side view of an example implementation of a vehicle having a stereo vision-based camera system, in accordance with aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A height clearance detection feature is designed to alert drivers with both visual and audible signals when the available height clearance ahead of their vehicle is lower than a preconfigured passing height, such as the height of their vehicle. To meet this objective, the height clearance detection system can warn the driver if the height of the open space in front of the vehicle falls below the vehicle's own height. This warning can be triggered prior to reaching a specified distance from the obstacle that has been detected. By adhering to these requirements, the height clearance detection feature enhances driver awareness and ensures sufficient clearance with regard to approaching overhead obstacles, such as garages, tunnels, overhead signage, and the like. Several hurdles may need to be overcome to ensure accurate and reliable detection of overhead obstacles, such as sensor limitations, environmental factors, occlusions, image misalignment, and/or noise filtering techniques. For example, properly removing signal noise from stereo images may facilitate implementing the subject height clearance detection system.

Embodiments of the subject technology provide for a height clearance detection system utilizing stereo image data captured by vehicle cameras to predict a road surface height and an overhead obstacle height, and to compute a height clearance between the two predicted heights. The vehicle camera system applies data indicative of the height clearance to an occupancy grid for notifying a user of the vehicle on whether there is sufficient height clearance for the vehicle to continue traveling along the current route projection. Because stereo image data may include noise, intermediate steps may be taken to filter out this noise. Accordingly, embodiments of the subject technology relating to the stereo vision-based height clearance detection can include 1) generating a depth map from the stereo images, 2) generating an initial road segmentation by performing a gradient-based graph search on the depth map, 3) fitting a refined quadratic road model to the initial road segmentation with a region-growing process driven by a stereo depth error model and determine a road surface height, 4) fusing and filtering the road surface height across multiple frames, 5) representing non-road features including features representing overhead obstacles in the depth map as stixels, and/or 6) estimating the front (or rear) height clearance with a probabilistic occupancy grid indicating the stixels representing the overhead obstacles.

FIG. 1 is a diagram illustrating an example implementation of a moveable apparatus as described herein. In the example of FIG. 1, the vehicle 100 is implemented as a truck (e.g., a pickup truck) having cameras. As shown, the cameras may include stereo vision cameras 110, 111. In one or more implementations, the cameras 110-111 can be mounted on the front of the vehicle 100, and their images are processed by a computing device (e.g., electronic control unit 150) to detect and locate obstacles in the path of the vehicle 100. The cameras 110-111 are depicted as being positioned substantially adjacent to one another on a top frame of the vehicle 100 above the front windshield window in a forward-facing direction for illustrative purposes; however, the position, pitch, and/or orientation of the cameras 110-111 and/or the distance between the cameras 110-111 may vary depending on implementation without departing from the scope of the present disclosure. For example, the cameras 110-111 may be positioned on other locations of the vehicle 100, such as a front bumper, sideview mirrors, a hood, a tailgate, a rear bumper, or the like.

In one or more implementations, the vehicle 100 may be an electric vehicle having one or more electric motors that drive the wheels 102 of the vehicle using electric power from a battery pack (not shown). In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In one or more implementations, one or more of the cameras 110-111, one or more of the location sensors, and/or other sensors of the vehicle 100 may periodically capture location data to determine a surround view of the vehicle 100. In one or more implementations, one or more of the cameras 110-111 of the vehicle 100 may periodically capture one or more images, and the vehicle 100 may analyze the images (e.g., via object recognition) to determine whether any obstructions are detected as approaching the vehicle 100 along a path trajectory. Where the location data is captured as one or more images (e.g., by the cameras 110-111), the vehicle 100 may analyze the images to determine whether such obstructions around a vicinity of the vehicle 100 are visible in the images. Where the location data is captured as global positioning system (GPS) data (e.g., by geo-location sensors 430 of FIG. 4), the vehicle 100 may analyze the location data with respect to a known route trajectory of the vehicle 100 to determine whether any detected objects are located along the route trajectory of the vehicle 100. In other aspects, the vehicle 100 may analyze the images to determine an omnidirectional visualization of the surroundings of the vehicle 100 and provide a surround view of the vehicle 100. For example, the subject system may process the data from all cameras (e.g., cameras 110-111) and create a cohesive image that accurately reflects the position and orientation of the vehicle 100 relative to its surroundings.

In some implementations, the vehicle 100 can include an electronic control unit (ECU) 150. Since stereo image processing can be computationally intensive, the ECU 150 may include a powerful processing unit such as a dedicated graphics processing unit (GPU) or field-programmable gate array (FPGA) to perform the necessary image processing in real-time.

The subject system may use a combination of computer vision techniques and advanced algorithms to accurately track the position and orientation of the vehicle 100. The subject system may receive information about the geometry of the vehicle 100 as input parameters, as well as the surrounding environment. The system also may detect obstacles and other vehicles in the environment and display them, for example, in a front (or rear) view image via a display 160 of the vehicle 100.

In one or more implementations, the vehicle camera system may provide a clear and intuitive user interface for displaying the height clearance detection images. This could involve integrating the height clearance detection image display with existing dashboard displays or providing a separate display dedicated to the height clearance detection images. The display 160 may potentially include additional features such as object detection or distance estimation to further enhance driver awareness and safety. In one or more other implementations, the vehicle camera system may provide other versions of alerts, such as audible warnings, heads-up display (HUD) warnings, and the like.

In some implementations, at least one of the cameras 110-111 may be wireless. In this regard, a mechanism for wireless communication between the cameras 110-111 and the ECU 150 may be implemented. This can involve using a wireless protocol such as Bluetooth or Wi-Fi, or using specialized wireless modules such as ZigBee or LoRa for longer-range communication. To ensure reliable transmission of the images over wireless communication, data transfer protocols such as transmission control protocol (TCP) or user datagram protocol (UDP) can be used. These protocols enable error detection and correction, packet retransmission, and other mechanisms to ensure reliable data transfer over unreliable wireless links.

In one or more implementations, stereo calibration can be performed while the vehicle 100 is moving to calculate precise depth perception and 3D reconstruction to support the processing of stereo images from multiple vehicle cameras. For example, the stereo calibration may include several steps such as calibration image acquisition, feature extraction from the calibration images, correspondence estimation between the calibration images, calibration parameter estimation, stereo camera distortion correction, and/or calibration validation. To provide the most comprehensive and accurate height clearance detection, the vehicle camera system may potentially incorporate data from multiple types of sensors in addition to the image sensors 110-111. This can include sensors such as lidar or radar to provide additional depth and distance information, as well as sensors to detect the orientation and movement of the vehicle 100.

Figure 2:
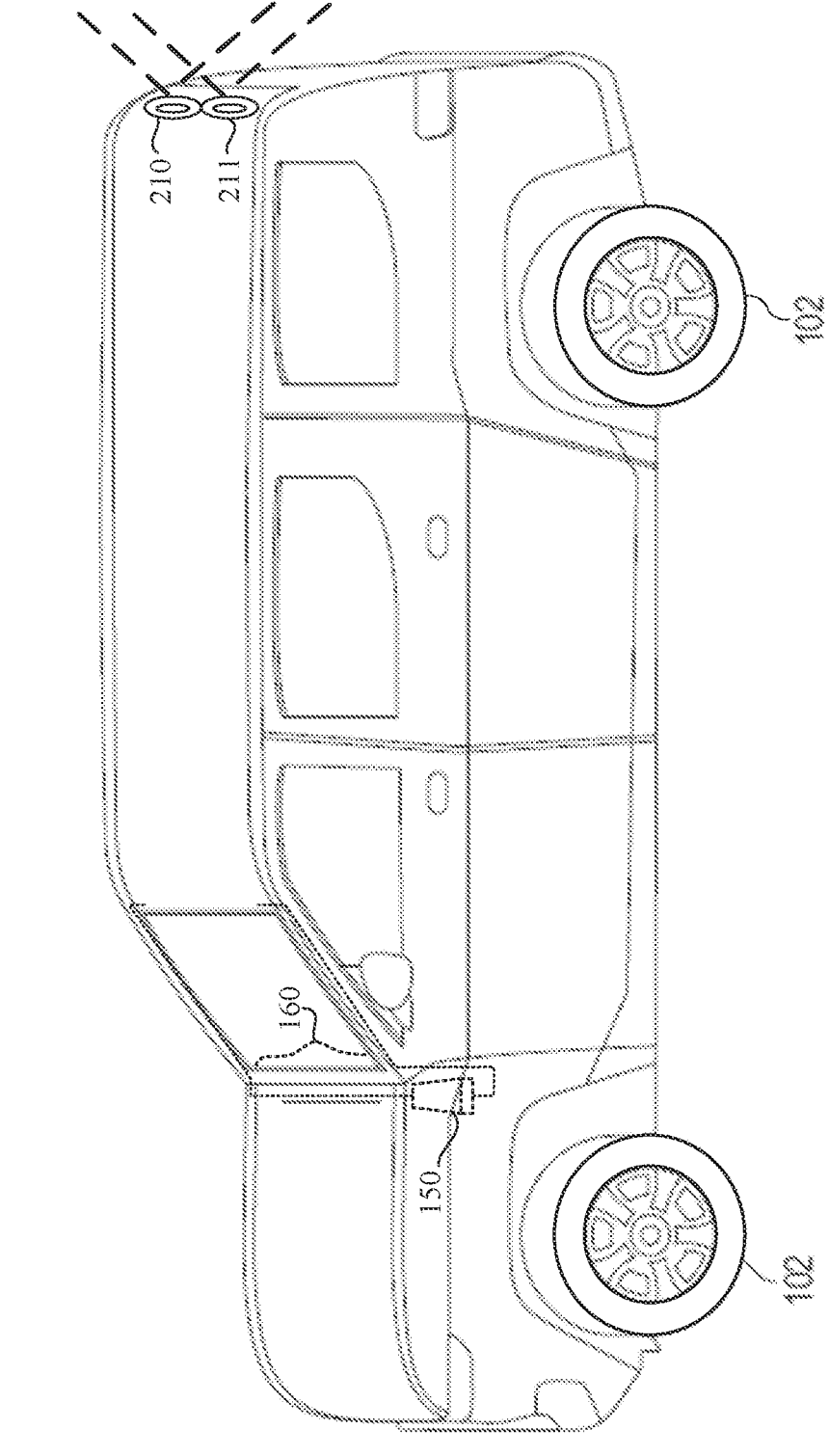
FIG. 2 illustrates a schematic perspective side view of another example implementation of a vehicle having a stereo vision-based camera system, in accordance with aspects of the present disclosure.
Figure 3:
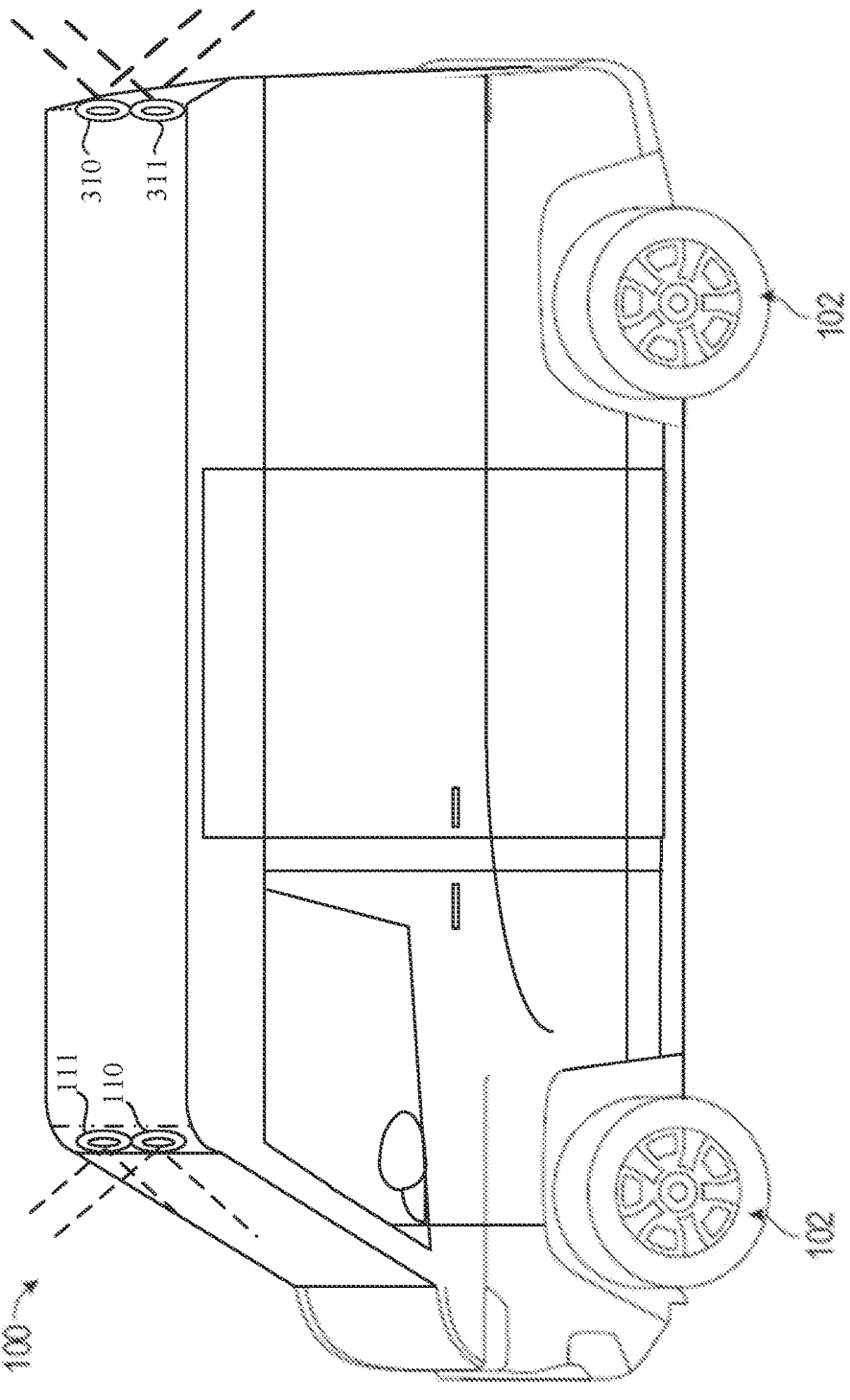
FIG. 3 illustrates a schematic perspective side view of still another example implementation of a vehicle having a stereo vision-based camera system, in accordance with aspects of the present disclosure.

As illustrated in FIG. 1, the stereo vision cameras 110-111 are positioned at the front of the vehicle 100 with a front-facing placement. The example of FIG. 1 in which the vehicle 100 is implemented as a pickup truck having a truck bed at the rear portion thereof is merely illustrative. For example, FIG. 2 illustrates another implementation in which the vehicle 100 including stereo vision cameras 210-211 is implemented as a sport utility vehicle (SUV), such as an electric sport utility vehicle. In the example of FIG. 2, the vehicle 100 including the stereo vision cameras 210-211 may include a cargo storage area that is enclosed within the vehicle 100 (e.g., behind a row of seats within a cabin of the vehicle). As illustrated in FIG. 2, the stereo vision cameras 210, 211 are positioned at the rear of the vehicle 100 with a rear-facing placement. In another example, FIG. 3 illustrates still another implementation in which the vehicle 100 including the stereo vision cameras 110-111 and 310-311 is implemented as a commercial van, such as an electric delivery van. In the example of FIG. 3, the vehicle 100 including the stereo vision cameras 110-111 and 310-311 may include a cargo storage area that is enclosed within the vehicle 100 (e.g., within a cabin of the vehicle). As illustrated in FIG. 3, the stereo vision cameras 110-111 are positioned at the front of the vehicle 100 with a front-facing placement and the stereo vision cameras 310-311 are positioned at the rear of the vehicle 100 with a rear-facing placement. In other implementations, the vehicle 100 may be implemented as another type of electric truck, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus (e.g., a battery pack or other battery unit that powers the propulsion or drive components of the moveable apparatus). The stereo vision camera placements as illustrated in FIGS. 1-3 are for illustrative purposes, and their placement on the vehicle 100 may vary depending on implementation without departing from the scope of the present disclosure.

Figure 4:
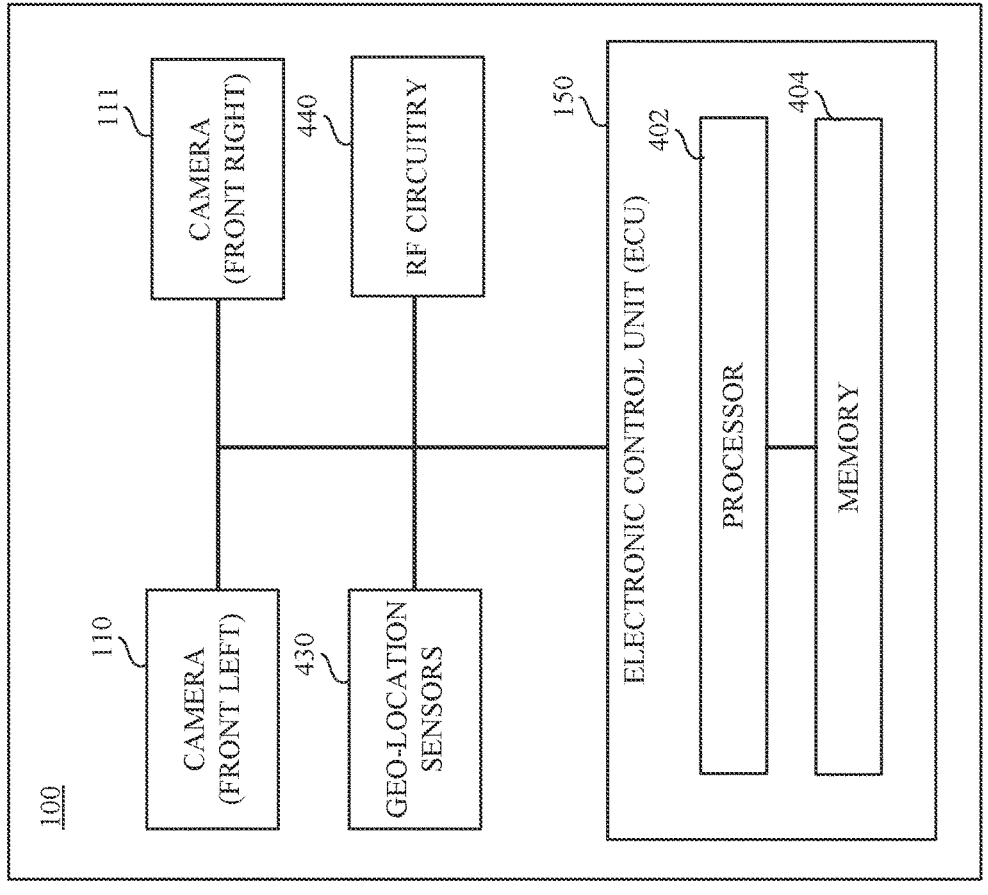
FIG. 4 illustrates a diagram of an example vehicle including a system for stereo vision-based height clearance detection in accordance with one or more implementations of the subject technology.

FIG. 4 illustrates a diagram of an example vehicle including a system for stereo vision-based height clearance detection in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The vehicle 100 may include one or more ECUs 150, one or more cameras 110, one or more geo-location sensors 430, and radio frequency (RF) circuitry 440. The ECU 150 may include a processor 402 and a memory 404. In one or more implementations, the vehicle 100 may include a processor 402 and/or a memory 404 separate from the ECU 150. For example, the vehicle 100 may not include the ECU 150 and may include the processor 402 as a part or all of a separate semiconductor device. In one or more implementations, vehicle 100 may include multiple ECUs 150 that each control particular functionality of the vehicle 100.

The processor 402 may include suitable logic, circuitry, and/or code that enables processing data and/or controlling operations of the vehicle 100. In this regard, the processor 402 may be enabled to provide control signals to various other components of the vehicle 100. The processor 402 may also control transfers of data between various portions of the vehicle 100. The processor 402 may further implement an operating system, such as a real-time operating system, or may otherwise execute code to manage operations of the vehicle 100. The processor 402 may perform all, or almost all, of the embodiments of the subject technology.

The memory 404 may include suitable logic, circuitry, and/or code that enable storage of various types of information such as received data, machine learning model data (such as for computer vision and/or other user/object detection algorithms), user authentication data, and/or configuration information. The memory 404 may include, for example, random access memory (RAM), read-only memory (ROM), flash, and/or magnetic storage. In one or more implementations, the memory 404 may store identifiers and/or authentication information of one or more users to determine authorized users and/or authorized authentication devices of the vehicle 100. The memory 404 may also store account information corresponding to an authorized user for exchanging information between the vehicle 100 and a remote server. The memory 404 may also store location data, including the geographic locations of charging stations and the frequency at which one or more charging stations is used to charge the battery. The memory 404 may also store battery data, including an amount of time that has elapsed since the battery was last charged.

The cameras 110-111 may be, or be included at least in part in, an onboard camera, dashcam, event camera, infrared camera, video camera, or any other type of device that captures digital image representations of a physical environment. The cameras 110-111 may be used to capture images for detecting and/or recognizing objects. For example, images captured by at least one of the cameras 110-111 may be input into a trained obstacle detection model for identifying a road or non-road obstacle, which may be compared to, for example, a database of road data stored in the memory 404.

The RF circuitry 440 may include suitable logic, circuitry, and/or code that enables wired or wireless communication, such as locally within the vehicle 100 and/or between the vehicle 100 and one or more remote servers or devices. The RF circuitry 440 may include, for example, one or more of an ultra-wideband (UWB) interface, a Bluetooth communication interface, an near-field communication (NFC) interface, a Zigbee communication interface, a wireless local area network (WLAN) communication interface, a universal serial bus (USB) communication interface, a cellular interface, or generally any interface for transmitting and/or receiving electronic communications. The RF circuitry 440 can communicate with or otherwise detect other cameras positioned on the vehicle 100, for example by detecting a proximate camera with UWB ranging.

In one or more implementations, one or more of the processor 402, the memory 404, the cameras 110-111, the geo-location sensors 430, the RF circuitry 440, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

Figure 5:
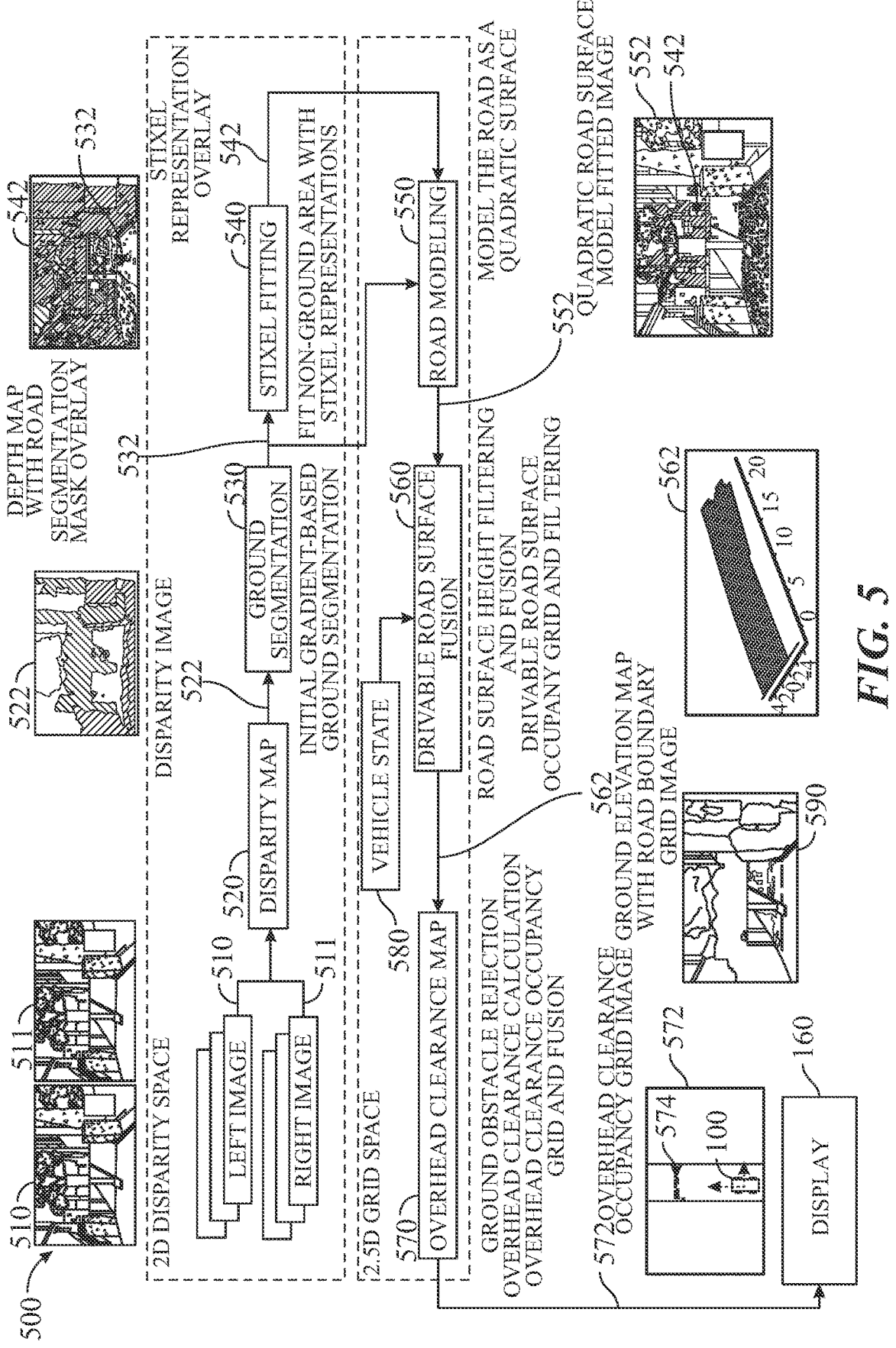
FIG. 5 illustrates a process flow diagram of an example of stereo vision-based height clearance detection system on a vehicle in accordance with one or more implementations of the subject technology.

FIG. 5 illustrates a process flow diagram 500 of an example of stereo vision-based height clearance detection system on a vehicle in accordance with one or more implementations of the subject technology. The process flow diagram 500 includes a disparity map component 520 that receives stereo images (e.g., one or more left images 510 and one or more right images 511) from different cameras and feeds a disparity image 522 to a ground segmentation component 530. The ground segmentation component 530 feeds a road segmentation image 532 to stixel fitting component 540 and to road modeling component 550. In one or more implementations, the ground segmentation component 530 sends its road segmentation image 532 to the stixel fitting component 540 and the road modeling component 550 at different times (e.g., first to the stixel fitting component 540 then subsequently to the road modeling component

550, or vice versa). In one or more other implementations, the ground segmentation component 530 sends its road segmentation image 532 to the stixel fitting component 540 and the road modeling component 550 concurrently. As illustrated in FIG. 5, the disparity map component 520, the ground segmentation component 530 and the stixel fitting component 540 may operate in the 2D disparity space, whereas the road modeling component 550, the drivable road surface fusion component 560 and the overhead clearance map component 570 may operate in a 2.5D grid space. In some aspects, the 2.5D grid space may refer to a representation of the 3D world in a 2D grid format. It may be used to capture the depth information of a scene or object captured by a stereo camera system. The 2.5D grid space may be a top-down view 2D grid, where each grid cell corresponds to a specific 3D location in the scene. The depth or disparity value obtained from stereo matching algorithms may be assigned to the corresponding grid cell. In this regard, the depth information can be discretized and organized spatially in a grid structure such that each cell in the 2.5D grid space contains information about the road surface height. When the 2.5D grid space is representing the road surface height, the 2.5D grid space may be implemented as a top-down view elevation map. In some aspects, the 2D disparity space may refer to an image where the intensity values represent the disparities between corresponding points in the left and right stereo images. The 2D disparity space may be used to visualize and analyze the estimated disparities or depth information of a scene captured by a stereo camera system.

The road modeling component 550 may send a quadratic road surface model fitted image 552 to a drivable road surface fusion component 560. In one or more implementations, the drivable road surface fusion component 560 may receive a vehicle state, such as vehicle state information 580. In one or more implementations, the drivable road surface fusion component 560 may send a ground elevation map with road boundary grid image 562 to an overhead clearance map component 570. In one or more implementations, the overhead clearance map component 570 sends an overhead clearance occupancy grid image 572 to the display 160. In one or more implementations, the overhead clearance occupancy grid image 572 may be, or include at least in part, a static image provided for display via the display 160. In one or more other implementations, the overhead clearance occupancy grid image 572 may be, or include one or more images as part of, a video stream provided for display via the display 160. In one or more implementations, each of the disparity map component 520, the ground segmentation component 530, the stixel fitting component 540, the road modeling component 550, the drivable road surface fusion component 560, and the overhead clearance map component 570 is implemented by, at least in part, the processor 402 in the ECU 150.

The vehicle camera system uses at least two cameras (e.g., cameras 110-111 of FIGS. 1-4) to capture the one or more left images 510 and one or more right images 511 of the same scene (e.g., surroundings in front of the vehicle 100) from slightly different perspectives, which allows for the creation of a 3D depth map of the surrounding environment. For example, the one or more left images 510 may be captured with the camera 110 and the one or more right images 511 may be captured with the camera 111. The disparity map component 520 can analyze the disparity between the one or more left images 510 and the one or more right images 511, which is the difference in position of corresponding points in two images. For example, the disparity value may represent the horizontal shift needed to align corresponding points between the left images 510 and the right images 511. The disparity value may indicate how far left or right the corresponding point is in the stereo image pair. Positive disparity values can represent points that are shifted to the right in the left image 510 compared to the right image 511, and negative disparity values represent points shifted to the left. The disparity map component 520 can then use this information to create a disparity image 522 that represents the 3D depth map of the surrounding environment. In some implementations, the disparity image 522 may be a grayscale image where each pixel value corresponds to the disparity or depth of the corresponding point in the scene.

In one or more implementations, the disparity map component 520 may perform multiple steps to generate the disparity image 522. For example, the disparity map component 520 may first perform a rectification step by transforming the stereo images (e.g., the one or more left images 510 and one or more right images 511) so that corresponding points in both stereo images lie on the same horizontal scanline. For example, a rectification transform may be applied to each stereo image (e.g., 510-611) that warps the stereo image so that corresponding points lie on the same horizontal scanline. The rectification transform may be computed based on intrinsic and extrinsic parameters of the stereo cameras (e.g., cameras 110-111 of FIG. 1). In some aspects, the horizontal scanline may refer to a row of pixels in the rectified stereo images that corresponds to a specific horizontal position in the original stereo images (e.g., 510-611). Once the stereo images have been rectified, the disparity map component 520 may perform stereo matching by comparing the pixel intensities along the corresponding horizontal scanlines in the two rectified images. In one or more implementations, the disparity map component 520 may identify corresponding features between the stereo matched images by using one or more feature detection and matching algorithms, such as a scale-invariant feature transform (SIFT) algorithm or a speeded up robust feature (SURF) algorithm. Once the corresponding features in both images are identified, the disparity map component 520 may calculate the disparity between the images.

In one or more implementations, the ground segmentation component 530 performs an initial gradient-based ground segmentation of the disparity image 522 and generates the road segmentation image 532. In one or more implementations, the ground segmentation component 530 may estimate the depth values of the pixels based on the calculated disparity values in the disparity image 522. In one or more implementations, the ground segmentation component 530 may perform multiple steps to generate the road segmentation image 532. For example, the ground segmentation component 530 may generate a gradient map containing gradient values from the depth values of the pixels in the disparity image 522 by computing the magnitude and direction of the gradient at each pixel. In some aspects, the gradient value may refer to a vertical gradient and/or horizontal gradient of adjacent pixels in the disparity image 522. In one or more implementations, the ground segmentation component 530 may perform local smoothing to the gradient values to remove sharp noise points.

The ground segmentation component 530 may identify pixels or regions in the disparity image 522 that correspond to a road surface to separate the road pixels from the non-road pixels in the disparity image 522. In one or more other implementations, the ground segmentation component 530 may identify the road pixels and non-road pixels in the gradient map. The ground segmentation component 530 may utilize color segmentation, texture analysis, edge detection, and/or machine learning algorithms to identify the road pixels and non-road pixels in the disparity image 522. In one or more implementations, the ground segmentation component 530 may generate a binary mask or a set of labeled regions that indicate which pixels in the disparity image 522 belong to the road surface and which pixels belong to other objects or background. For example, the ground segmentation component 530 generates the road segmentation image 532 that indicates the road surface pixels. In one or more implementations, the road segmentation image 532 includes a mask overlay identifying the segmented road surface in the road segmentation image 532.

In one or more implementations, the ground segmentation component 530 may generate a gradient-based graph from the gradient map by initiating a region growing process with an initial seed pixel or a region of interest, and then growing the region by iteratively adding neighboring pixels or regions that satisfy certain criteria, such as a gradient difference between adjacent pixels in the gradient map. In one or more implementations, the ground segmentation component 530 selects seed ground points using a predefined region on the gradient map. In some aspects, the ground segmentation component 530 may generate the road segmentation image 532 by assigning a binary value to each pixel in the gradient-based graph based on whether the pixel belongs to the road or not by comparing the pixel values against a predefined gradient change threshold or using other segmentation algorithms. In one or more implementations, the ground segmentation component 530 determines whether a gradient value in the predefined region is smaller than a first gradient change threshold (which may correspond to an angle value in degrees). For example, if the ground segmentation component 530 determines that the gradient value in the predefined region is smaller than the first gradient change threshold, the ground segmentation component 530 may select a corresponding pixel in the predefined region as a seed ground point. Subsequently, the ground segmentation component 530 can propagate these seed points to the entire disparity image 522 with a gradient-based graph search, such as a depth-first search (DFS) graph search or a breadth-first search (BFS) graph search: The adjacent neighbor pixels can be added as seed points if the gradient difference is smaller than a second gradient change threshold. In one or more implementations, the second gradient change threshold corresponds to a smaller angle value in degrees than the first gradient change threshold. The DFS graph search may be an example of a graph search algorithm configured to search all adjacent vertices along a branch of a current vertex and backtracking to a prior vertex to resume the search of unsearched adjacent vertices along a branch of the prior vertex for all vertices in the gradient-based graph. The BFS graph search may be another example of a graph search algorithm configured to search through each vertex in the gradient-based graph by searching all vertices in one level before traversing to a next level for each level of the gradient-based graph.

In one or more implementations, the road modeling component 550 may model the road surface as a quadratic surface. For example, the road modeling component 550 may assume that the road surface can be approximated by a quadratic function. In one or more implementations, the road modeling component 550 may generate the quadratic road surface model fitted image 552 by fitting a quadratic function to a region corresponding to the segmented road surface in the road segmentation image 532 using a least-squares optimization method. In one or more implementations, the quadratics function may be defined as $Y=a \cdot X+b \cdot X^2+c \cdot Z+d \cdot Z^2+e$, where X and Y are coordinates of a 3D point in the 3D camera coordinate (origin at camera center), and a, b, c, d and e are the parameters of the quadratic function. In one or more implementations, the values of parameters a, b, c, d and e can be found by minimizing the least squares objective function defined as $$S = \sum_{i=1}^{n} \left( Y_i \pm \left( A \cdot X_i + b \cdot X_i^2 + c \cdot Z_i + d \cdot Z_i^2 + e \right) \right)^2.$$

In one or more implementations, the road modeling component 550 may refine the quadratic function using a region growing process and a stereo depth error model associated with the disparity image 522. In one or more implementations, the stereo depth error model is generated from a stereo camera specification and calibration. In some aspects, the stereo camera specification may define the geometry and characteristics of the stereo camera setup, and may include parameters such as the baseline distance between the stereo cameras (e.g., 110, 111 of FIG. 1), the focal length of the lenses, the image sensor size, and the resolution of the images captured by each of the stereo cameras. The stereo camera calibration may be performed to determine the intrinsic and extrinsic parameters of each stereo camera in the stereo camera pair. In some aspects, each stereo camera may capture images of a calibration pattern with known 3D geometry from different perspectives and using computer vision techniques (or machine learning techniques) to estimate the stereo camera parameters. In this regard, the disparity image 522, for example, can be generated using the stereo cameras 110, 111 once they are calibrated. In one or more implementations, the road modeling component 550 may calculate stereo depth error data using a tunable disparity uncertainty value. In one or more implementations, the road modeling component 550 may obtain the stereo depth error model based on the stereo depth error data.

The stereo depth error model may characterize errors in depth values of the disparity image 522 by capturing the statistical properties of the depth errors or uncertainties that are present in the disparity image 522 and providing a mathematical representation of these properties. The road modeling component 550 may utilize the stereo depth error model to determine inliers and/or outliers in the road segmentation image 532. In some aspects, the inliers may refer to pixels or regions that are consistent with the modeled depth information of the road surface and have a low stereo depth error according to the stereo depth error model, whereas the outliers may refer to pixels or regions that deviate significantly from the expected depth values and have a higher stereo depth error according to the stereo depth error model.

The region growing process can be driven by the stereo depth error model to refine the initial depth estimates and improve the accuracy of the quadratic road surface model fitted image 552. For example, the road modeling component 550 may first select a pixel in the road segmentation image 532 with the road segmentation mask overlay as an initial seed point that corresponds to a portion of the road surface in the scene. The road modeling component 550 may perform the region growing process on the road segmentation image 532 to iteratively expand the initial seed point into a grown region by adding neighboring pixels around the initial seed point. The road modeling component 550 may refine one or more depth values in the grown region using the stereo depth error model, and thereafter fit the quadratic model to the grown region with the refined one or more depth values to generate a refined quadratic road model. In one or more implementations, the refined quadratic road model may be defined as $Y=aX^2+bZ^2+cXZ+dX+eZ+f$, where Y is the estimated road surface height, X and Z are the coordinates of a 3D point in the 3D camera coordinate (origin at camera center), and a, b, c, d, e, and f are the coefficients of the model. In one or more implementations, the XZ term is optional.

In one or more other implementations, the ground segmentation component 530 performs an intermediate step between the initial gradient-based ground segmentation and the quadratic model fitting by analyzing the gradient-based graph and identifying clusters of nodes that correspond to the road or driving surface using techniques such as clustering (e.g., K-means, mean shift or spectral clustering) or segmentation algorithms. In some aspects, each node in the gradient-based graph may be assigned to a cluster that it belongs to based on its proximity to the cluster centers or other predefined criteria. The ground segmentation component 530 may then filter the identified clusters to remove noise or non-road nodes, such as nodes that correspond to obstacles or other objects in the scene, using techniques such as morphological operations, region growing, or machine learning algorithms. For example, the ground segmentation component 530 may utilize region growing by grouping neighboring pixels or regions that have similar characteristics into larger regions or objects. In this regard, the road modeling component 550 may model the road surface as a quadratic surface based on the filtered clusters from the ground segmentation component 530.

The stixel fitting component 540 may perform stixel computation to generate a stixel representation overlay 542 containing stixel representations that represent non-road data in the disparity image 522. In one or more implementations, the stixel fitting component 540 may segment the disparity image 522 into vertical columns (or referred to as stixel columns) that each contain one or more stixels, where each stixel may include a set of pixels with similar disparity values but the stixels within the stixel column may include different disparity values. For each stixel column, a set of stixels may be assumed as vertical planes and may be evaluated based on different criteria, such as geometric consistency, occlusion relationships with the road surface and other stixels, and/or appearance features. The stixels within each stixel column that do not belong to the road surface may be classified as non-road stixels. In one or more implementations, stixels connected to ground may be referred to as a ground stixel. The ground stixel may represent a non-road stixel. In one or more other implementations, stixels that can be connected to ground via other stixels to the ground can be referred to as a ground stixel. In one or more other implementations, stixels having a gap between the stixel and ground can be classified as an overhead stixel. In one or more other implementations, stixels within each stixel column that do belong to the road surface may be classified as road stixels. The non-road stixels may be represented as non-road stixel representations having a rectangular shape with dimensions corresponding to their estimated height and position in the scene. In one or more implementations, the quadratic road surface model fitted image 552 includes the stixel representations from the stixel representation overlay 542 provided by the stixel fitting component 540.

In one or more implementations, the drivable road surface fusion component 560 may perform road surface height filtering and fusion. In some aspects, the drivable road surface fusion component 560 may map drivable road surface height estimates by averaging the height estimate values between consecutive frames. The drivable road surface fusion component 560 may receive vehicle state information 580 indicating a status, condition, and/or parameters relating to the vehicle 100 including vehicle height and/or stereo-to-vehicle calibration to facilitate the drivable road surface fusion component 560 with mapping the drivable road surface height estimates to the segmented road surface according to the vehicle state information 580. In one or more implementations, the drivable road surface fusion component 560 may determine road surface height information for corresponding portions of the road segmentation. In one or more implementations, the drivable road surface fusion component 560 may determine a road surface height grid for the road segmentation image 532, where each cell of the road surface height grid provides a road surface height value. In some aspects, the road surface height grid maps to the segmented road surface. The road surface height grid may be built by calculating the road surface height grid with the refined quadratic road model (which is fitted to the initial road segmentation) at all points in the scene that correspond to the road segmentation image 532. For example, to compute the road surface height value for a given grid cell, the drivable road surface fusion component 560 may substitute the coordinates of that point (X,Z) into the refined quadratic road model equation, and the resulting value of Y represents the estimated height of the road surface at that point for the corresponding grid cell. In some aspects, the road surface height may refer to the height of drivable road surface at one or more cells in a drivable road surface occupancy grid.

In one or more other implementations, the drivable road surface fusion component 560 may perform drivable road surface occupancy grid generation and filtering. For example, the drivable road surface fusion component 560 may map the drivable road surface occupancy grid to the quadratic road surface model fitted image 552 by a multi-frame probabilistic update, resulting in the generation of the ground elevation map with road boundary grid image 562. The drivable road surface occupancy grid may have false positive overhead obstacles in a non-drivable area removed for enhancing clarity of the grid. In one or more implementations, drivable road surface occupancy grid may have ground dynamic obstacles removed by multi-frame probabilistic update to help distinguish between ground static obstacles and ground dynamic obstacles. In some aspects, a ground static obstacle may refer to a building, tree, curb, parked vehicle, or the like, whereas a ground dynamic obstacle may refer to a moving vehicle, pedestrian, or the like. The drivable road surface occupancy grid may be configured to identify an overhead obstacle within the segmented road surface. In some aspects, an overhead obstacle may refer to an overhead clearance bar, a traffic sign, or the like.

In one or more implementations, the overhead clearance map component 570 may perform ground obstacle rejection, overhead clearance calculation and/or overhead clearance occupancy grid generation and fusion. In some aspects, the overhead clearance map component 570 may select non-road stixel representations that belong to overhead obstacles by analyzing their geometry and position relative to the road surface based on the road surface height. In some aspects, the overhead clearance map component 570 may estimate the height of the obstacle by measuring its distance from the road surface height at that location of the obstacle. In one or more implementations, the overhead clearance map component 570 may select the non-road stixel representations having an estimated height value greater than a height threshold and is a stixel that cannot be connected to ground via other stixels, classified as an overhead obstacle. The overhead clearance map component 570 may reject the non-road stixel representations having an estimated height value that is lesser than the height threshold and/or is a stixel that can be connected to ground via other stixels, classified as a ground obstacle. In one or more implementations, the height threshold may correspond to a vehicle height parameter value. In one or more other implementations, the height threshold may be reconfigurable such that the height threshold may be updated based on dynamic measurements of the vehicle height. In one or more other implementations, the vehicle height parameter value may be adjusted to primarily consider a towed object height (e.g., trailer height) that exceeds the vehicle height or the total height of the vehicle with overhead cargo.

In one or more implementations, the overhead clearance map component 570 may utilize the non-road stixel representations corresponding to the selected overhead obstacles to estimate the front (or any other position on the vehicle) height clearance with a probabilistic occupancy grid. The probabilistic occupancy grid may be a 2.5D top-down view representation of the scene that is divided into cells, where each cell represents a small area in the scene. The probabilistic occupancy grid may be used to estimate the probability of an obstacle being present in each cell. To estimate the height clearance, the stixel representations that belong to overhead obstacles are projected onto the probabilistic occupancy grid, and their positions and dimensions are used to update the occupancy probabilities of the corresponding cells in the probabilistic occupancy grid. The overhead clearance map component 570 may estimate the height clearance of each cell by measuring the height of the obstacles that occupy that cell, and subtracting it from the height of the grid cell. In some aspects, the height of the grid cell may correspond to the road surface height. The overhead clearance occupancy grid image 572 may include the resulting height clearance values visualized as a color-coded map 574, where different colors represent different height clearance ranges, along with a representation of the vehicle 100 locate relative to the location of the overhead obstacle. The overhead clearance map component 570 may provide, for display, via the display 160, the overhead clearance occupancy grid image 572. In one or more other implementations, the overhead clearance map component 570 may provide, for display, via the display 160, a 3D road surface image 590 that integrates the color-code map 574 indicative of the height clearance values.

In one or more implementations, one or more of the disparity map component 520, the ground segmentation component 530, the stixel fitting component 540, the road modeling component 550, the drivable road surface fusion component 560, the overhead clearance map component 570, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

FIG. 6 illustrates a flow diagram of an example process 600 for stereo vision-based height clearance detection on a vehicle in accordance with one or more implementations of the subject technology. For explanatory purposes, the process 600 is primarily described herein with reference to the vehicle 100 of FIGS. 1-5, and/or various components thereof. However, the process 600 is not limited to the vehicle 100 of FIG. 1, and one or more steps (or operations) of the process 600 may be performed by one or more other structural components of the vehicle 100 and/or of other suitable moveable apparatuses, devices, or systems. Further, for explanatory purposes, some of the steps of the process 600 are described herein as occurring in serial, or linearly. However, multiple steps of the process 600 may occur in parallel. In addition, the steps of the process 600 need not be performed in the order shown and/or one or more steps of the process 600 need not be performed and/or can be replaced by other operations.

At step 602, the processor 402 may obtain first data and second data from different cameras of the vehicle 100 respectively. For example, the first data may be obtained from a first camera (e.g., implemented as the camera 110) and the second data may be obtained from a second camera (e.g., implemented as the camera 111). In one or more implementations, the first data and the second data include stereo images.

At step 604, the processor 402 may generate a depth map based on a disparity between the first data and the second data, as described with reference to the disparity map component 520 in FIG. 5. In one or more implementations, the generating of the depth map may include rectifying the first data and the second data to a common horizontal scanline and determining corresponding feature points between the first data and the second data along the common horizontal scanline. The generating of the depth map may further include calculating a disparity value between the corresponding feature points in the first data and the second data. In some aspects, each pixel value in the depth map corresponds to the disparity value of a corresponding point in a scene of the depth map.

At step 606, the processor 402 may determine a road segmentation based at least in part on the depth map, as described with reference to the ground segmentation component 530 in FIG. 5. In one or more implementations, the determining the road segmentation may include generating a gradient map by calculating a magnitude and direction of a gradient at each pixel of the depth map and generating a gradient-based graph from the gradient map by initiating a first region growing process with a predefined region in the gradient map. The determining the road segmentation may further include generating a road mask from the gradient-based graph, the road mask indicating the road segmentation. In one or more implementations, the generating the gradient-based graph may include determining whether a gradient difference between a pixel in a predefined region of the depth map and an adjacent pixel in the predefined region is lesser than a first gradient change threshold. In one or more implementations, a pixel may be selected as a seed ground point in the predefined region based on the gradient difference between the pixel in the predefined region of the depth map being lesser than the first gradient change threshold. The generating the gradient-based graph may also include determining whether a gradient difference between a pixel outside the predefined region and an adjacent pixel outside the predefined region is lesser than a second gradient change threshold, in which the second gradient change threshold corresponds to an angle value in degrees that is smaller than the first gradient change threshold. The generating the gradient-based graph may further include adjusting the predefined region by adding a seed point beyond the predefined region using a graph search algorithm based on the gradient difference between the pixel outside the predefined region and the adjacent pixel outside the predefined region being lesser than a second gradient change threshold different than the first gradient change threshold.

In one or more implementations, the process 600 may include one or more steps to perform fitting of a quadratic model to the road segmentation to produce a refined quadratic road model using a region growing process and a stereo depth error model, as described with reference to the road modeling component 550 in FIG. 5. In some aspects, the stereo depth error model characterizes errors in depth values of the depth map. In one or more implementations, the fitting of the quadratic model to the road segmentation may include selecting a pixel in the road mask as an initial seed point that corresponds to a portion of the road surface in the scene and performing the region growing process on the road mask to iteratively expand the initial seed point into a grown region by adding neighboring pixels around the initial seed point. The fitting of the quadratic model to the road segmentation may further include refining one or more depth values in the grown region using the stereo depth error model and fitting the quadratic model to the grown region with the refined one or more depth values to generate the refined quadratic road model.

At step 608, the processor 402 may determining road surface height information for corresponding portions of the road segmentation, as described with reference to the drivable road surface fusion component 560 in FIG. 5. For example, the processor 402 may generate a road surface height grid with each cell of the road surface height grid indicating road surface height information for a corresponding portion of the road segmentation. In one or more implementations, the determining the road surface height information may include calculating a road surface height value with the refined quadratic road model at one or more points in the scene that correspond to the at least one portion of the road segmentation.

At step 610, the processor 402 may determine a height estimation of a non-road object corresponding to the at least one portion of the road segmentation, as described with reference to the overhead clearance map component 570 in FIG. 5. In one or more implementations, the process 600 may include one or more steps to perform detecting the non-road object in the depth map and segmenting the depth map into stixel representations, as described with reference to the stixel fitting component 540 in FIG. 5. In one or more implementations, the process 600 may further include classifying the stixel representations into road stixel representations and non-road stixel representations and identifying the non-road object as at least one of the non-road stixel representations in the depth map. For example, a non-road object may consist of multiple stixels.

In one or more implementations, the process 600 may include one or more steps to perform determining a location in a scene of the depth map corresponding to the at least one of the non-road stixel representations in the depth map. The process 600 may further include determining the height estimation of the at least one of the non-road stixel representations at the location in the scene that corresponds to the location of the non-road stixel representation. The process 600 may further include determining whether the height estimation of the at least one of the non-road stixel representations exceeds a height threshold relative to the road surface height. The process 600 also may further include determining whether the at least one of the non-road stixel representations is connected to ground via other non-road stixel representations. In some aspects, the one of the non-road stixel representations is identified as an overhead obstacle when the height estimation of the one of the non-road stixel representations exceeds the height threshold and the at least one of the non-road stixel representations is not connected to ground via other non-road stixel representations.

At 612, the processor 402 may provide an indication of a front (or rear) height clearance estimate for the at least one portion of the road segmentation based at least in part on the road surface height information and the height estimation of the non-road object, as described with reference to the overhead clearance map component 570 in FIG. 5. In one or more implementations, the providing of an indication of a front (or rear) height clearance estimate may include projecting the height estimation of the one of the non-road stixel representations into one or more cells of a probabilistic occupancy grid, in which the probabilistic occupancy grid includes cells with each cell indicating a probability that an overhead obstacle is present in the cell and determining the height clearance estimate by subtracting the height estimation of the one of the non-road stixel representations in a cell of the probabilistic occupancy grid from a height of the cell. In some aspects, the cell of the probabilistic occupancy grid indicates a value representing the height clearance estimate. In one or more implementations, the indication of the height clearance estimate is provided for display, for example, via the display 160 of the vehicle 100.

Figure 7:
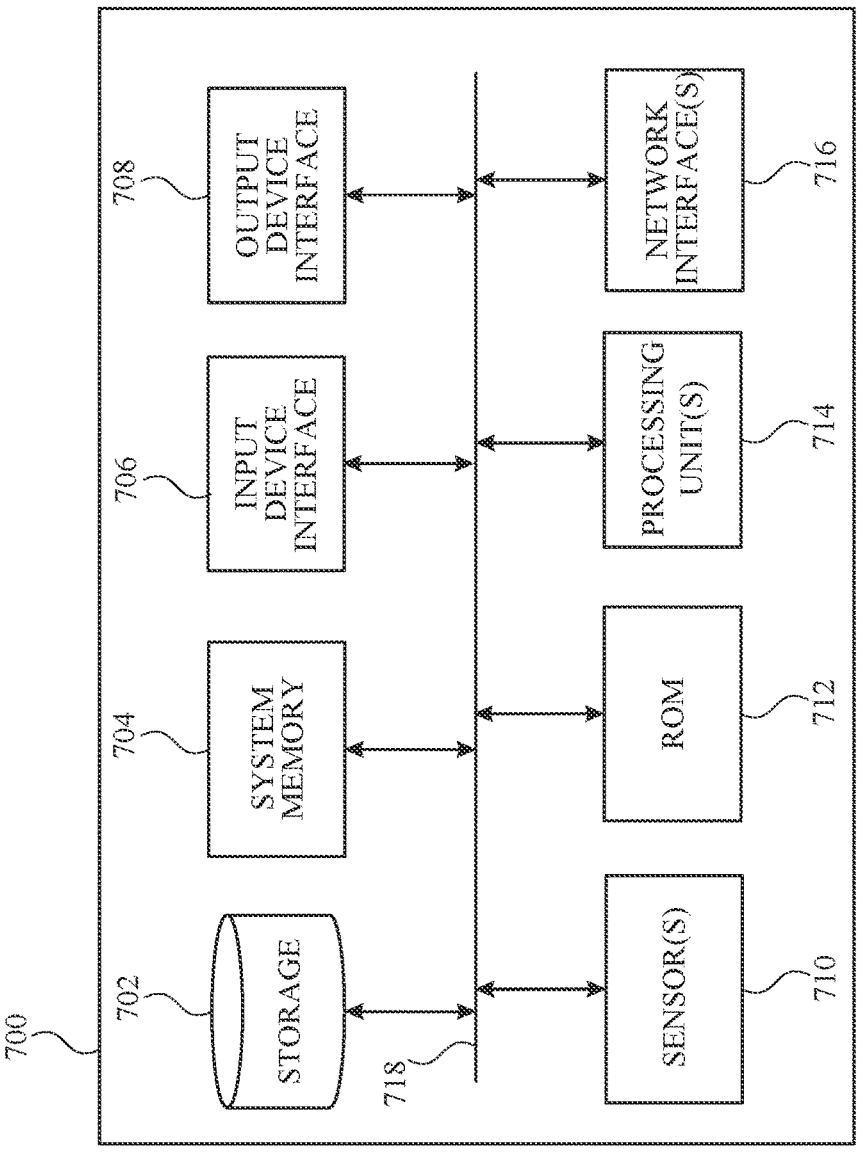
FIG. 7 illustrates an electronic system with which one or more implementations of the subject technology may be implemented.

FIG. 7 illustrates an example electronic system 700 with which aspects of the present disclosure may be implemented. The electronic system 700 can be, and/or can be a part of, any electronic device for providing the features and performing processes described in reference to FIGS. 1-6, including but not limited to a vehicle, computer, and server. The electronic system 700 may include various types of computer-readable media and interfaces for various other types of computer-readable media. The electronic system 700 includes a persistent storage device 702, system memory 704 (and/or buffer), input device interface 706, output device interface 708, sensor(s) 710, ROM 712, processing unit(s) 714, network interface 716, bus 718, and/or subsets and variations thereof.

The bus 718 collectively represents all system, peripheral, and chipset buses that communicatively connect the numerous internal devices and/or components of the electronic system 700, such as any of the components of the vehicle 100 discussed above with respect to FIG. 4. In one or more implementations, the bus 718 communicatively connects the one or more processing unit(s) 714 with the ROM 712, the system memory 704, and the persistent storage device 702. From these various memory units, the one or more processing unit(s) 714 retrieves instructions to execute and data to process in order to execute the processes of the subject disclosure. The one or more processing unit(s) 714 can be a single processor or a multi-core processor in different implementations. In one or more implementations, one or more of the processing unit(s) 714 may be included on an ECU 150, such as in the form of the processor 402.

The ROM 712 stores static data and instructions that are needed by the one or more processing unit(s) 714 and other modules of the electronic system 700. The persistent storage device 702, on the other hand, may be a read-and-write memory device. The persistent storage device 702 may be a non-volatile memory unit that stores instructions and data even when the electronic system 700 is off. In one or more implementations, a mass-storage device (such as a magnetic or optical disk and its corresponding disk drive) may be used as the persistent storage device 702.

In one or more implementations, a removable storage device (such as a flash drive, and its corresponding solid-state device) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 714 may need at runtime. In one or more implementations, the processes of the subject disclosure are stored in the system memory 704, the persistent storage device 702, and/or the ROM 712. From these various memory units, the one or more processing unit(s) 714 retrieves instructions to execute and data to process in order to execute the processes of one or more implementations.

The persistent storage device 702 and/or the system memory 704 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a charging port closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 718 also connects to the input device interfaces 706 and output device interfaces 708. The input device interface 706 enables a user to communicate information and select commands to the electronic system 700. Input devices that may be used with the input device interface 706 may include, for example, alphanumeric keyboards, touch screens, and pointing devices. The output device interface 708 may enable the electronic system 700 to communicate information to users. For example, the output device interface 708 may provide the display of images generated by electronic system 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touch-screen. In these implementations, feedback provided to the user can be any form of sensory feedback, such as visual feedback, auditory feedback, or tactile feedback; and input from the user can be received in any form, including acoustic, speech, or tactile input.

The bus 718 also connects to sensor(s) 710. The sensor(s) 710 may include a location sensor, which may be used in determining device position based on positioning technology. For example, the location sensor may provide for one or more of global navigation satellite system (GNSS) positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 710 may be utilized to detect movement, travel, and orientation of the electronic system 700. For example, the sensor(s) may include an accelerometer, a rate gyroscope, and/or other motion-based sensor(s). The sensor(s) 710 may include one or more biometric sensors and/or cameras for authenticating a user.

The bus 718 also couples the electronic system 700 to one or more networks and/or to one or more network nodes through the one or more network interface(s) 716. In this manner, the electronic system 700 can be a part of a network of computers (such as a local area network or a wide area network). Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
obtaining, by a processor, first data and second data from different cameras of a vehicle respectively;
generating a depth map based on a disparity between the first data and the second data;

determining a road segmentation by performing a gradient-based graph search at least in part on the depth map;
generating a stereo depth error model to fit a refined quadratic road model to the road segmentation with a region growing process driven by the stereo depth error model;
determining road surface height information for corresponding portions of the road segmentation;
determining a height estimation of at least one stixel representation of a non-road object corresponding to at least one portion of the road segmentation; and
providing an indication of a height clearance estimate for the at least one portion of the road segmentation based at least in part on the road surface height information and the height estimation of the at least one stixel representation of the non-road object.

2. The method of claim 1, wherein the first data and the second data comprise stereo images.

3. The method of claim 1, wherein the generating the depth map comprises:
rectifying the first data and the second data to a common horizontal scanline;
determining corresponding feature points between the first data and the second data along the common horizontal scanline; and
calculating a disparity value between the corresponding feature points in the first data and the second data, wherein each pixel value in the depth map corresponds to the disparity value of a corresponding point in a scene of the depth map.

4. The method of claim 1, wherein the determining the road segmentation comprises:
generating a gradient map by calculating a magnitude and direction of a gradient at each pixel of the depth map;
generating a gradient-based graph from the gradient map by initiating a first region growing process with a predefined region in the gradient map; and
generating a road mask from the gradient-based graph, the road mask indicating the road segmentation.

5. The method of claim 4, wherein the generating the gradient-based graph comprises:
determining whether a gradient difference between a pixel in the predefined region of the gradient map and an adjacent pixel in the predefined region is lesser than a first gradient change threshold based on the magnitude and direction of the gradient at the pixel;
selecting the pixel as a seed ground point in the predefined region based on the gradient difference between the pixel in the predefined region and the adjacent pixel in the predefined region being lesser than a first gradient change threshold;
determining whether a gradient difference between a pixel outside the predefined region and an adjacent pixel outside the predefined region is lesser than a second gradient change threshold different than the first gradient change threshold; and
adjusting the predefined region by adding a seed point beyond the predefined region using a graph search algorithm based on the gradient difference between the pixel outside the predefined region and the adjacent pixel outside the predefined region being lesser than the second gradient change threshold.

6. The method of claim 5, further comprising fitting a quadratic model to the road segmentation to produce a refined quadratic road model using a second region growing process and the stereo depth error model, wherein the stereo depth error model characterizes errors in depth values of the depth map, wherein the fitting the quadratic model to the road segmentation comprises:

selecting a pixel in the road mask as an initial seed point;

performing the second region growing process on the road mask to iteratively expand the initial seed point into a grown region by adding neighboring pixels around the initial seed point;

refining one or more depth values in the grown region using the stereo depth error model; and fitting the quadratic model to the grown region with the refined one or more depth values to generate the refined quadratic road model.

7. The method of claim 6, wherein the determining the road surface height information comprises calculating a road surface height value with the refined quadratic road model at one or more points that correspond to the at least one portion of the road segmentation.

8. The method of claim 1, wherein the determining the road surface height information comprises generating a road surface height grid with each cell of the road surface height grid indicating the road surface height information for a corresponding portion of the road segmentation.

9. The method of claim 1, further comprising:

detecting the non-road object in the depth map;

segmenting the depth map into a plurality of stixel representations;

classifying the plurality of stixel representations into road stixel representations and non-road stixel representations; and identifying the non-road object as at least one of the non-road stixel representations in the depth map.

10. The method of claim 9, wherein the determining the height estimation of the non-road object comprises:

determining a location in a scene of the depth map corresponding to the at least one of the non-road stixel representations in the depth map;

determining the height estimation of the at least one of the non-road stixel representations at the location in the scene corresponding to the at least one of the non-road stixel representations; and determining whether the height estimation of the at least one of the non-road stixel representations exceeds a height threshold and whether the at least one of the non-road stixel representations is connected to ground via other non-road stixel representations, wherein the at least one of the non-road stixel representations is identified as an overhead obstacle when the height estimation of the one of the non-road stixel representations exceeds the height threshold and the at least one of the non-road stixel representations is not connected to ground via other non-road stixel representations.

11. The method of claim 9, wherein the providing an indication of a height clearance estimate comprises:

projecting the height estimation of the one of the non-road stixel representations into one or more cells of a probabilistic occupancy grid, wherein the probabilistic occupancy grid comprises a plurality of cells with each cell indicating a probability that an overhead obstacle is present in the cell; and determining the height clearance estimate by subtracting the height estimation of the one of the non-road stixel representations in a cell of the probabilistic occupancy grid from a height of the cell, wherein the cell of the probabilistic occupancy grid indicates a value representing the height clearance estimate.

12. The method of claim 1, wherein the indication of the height clearance estimate is provided for display on a user interface of a vehicle.

13. A system, comprising:

memory; and at least one processor coupled to the memory and configured to:

obtain first stereo image and second stereo image from different cameras of a vehicle respectively;

generate a depth map based on a disparity between the first stereo image and the second stereo image;

determine a road segmentation by performing a gradient-based graph search at least in part on the depth map;

generate a stereo depth error model to fit a refined quadratic road model to the road segmentation with a region growing process driven by the stereo depth error model;

generate a road surface height grid with each cell of the road surface height grid indicating road surface height information for a corresponding portion of the road segmentation;

detect a non-road object in the depth map;

segment the depth map into a plurality of stixel representations;

classify the plurality of stixel representations into road stixel representations and non-road stixel representations;

identify the non-road object as at least one of the non-road stixel representations in the depth map;

determine a height estimation of the at least one of the non-road stixel representations corresponding to at least one portion of the road segmentation; and provide an indication of a height clearance estimate for the at least one portion of the road segmentation based at least in part on the road surface height information and the height estimation of the at least one of the non-road stixel representations.

14. The system of claim 13, wherein the at least one processor configured to generate the depth map is further configured to:

rectify the first stereo image and the second stereo image to a common horizontal scanline;

determine corresponding feature points between the first stereo image and the second stereo image along the common horizontal scanline; and calculate a disparity value between the corresponding feature points in the first stereo image and the second stereo image, wherein each pixel value in the depth map corresponds to the disparity value of a corresponding point in a scene of the depth map.

15. The system of claim 13, wherein the at least one processor configured to determine the road segmentation is further configured to:

generate a gradient map by calculating a magnitude and direction of a gradient at each pixel of the depth map, generate a gradient-based graph from the gradient map by initiating a first region growing process with a predefined region in the gradient map, and generate a road mask from the gradient-based graph, the road mask indicating the road segmentation, wherein the at least one processor configured to generate the gradient-based graph is further configured to:

determine whether a gradient difference between a pixel in the predefined region of the gradient map and an adjacent pixel in the predefined region is lesser than a first gradient change threshold based on the magnitude and direction of the gradient at the pixel;

select the pixel as a seed ground point in the predefined region based on the gradient difference between the pixel in the predefined region and the adjacent pixel in the predefined region being lesser than a first gradient change threshold;

determine whether a gradient difference between a pixel outside the predefined region and an adjacent pixel outside the predefined region is lesser than a second gradient change threshold; and adjust the predefined region by adding a seed point beyond the predefined region using a graph search algorithm based on the gradient difference between the pixel outside the predefined region and the adjacent pixel outside the predefined region being lesser than a second gradient change threshold different than the first gradient change threshold.

16. The system of claim 15, wherein the at least one processor is further configured to fit a quadratic model to the road segmentation to produce the refined quadratic road model using a second region growing process and the stereo depth error model, wherein the stereo depth error model characterizes errors in depth values of the depth map, wherein the at least one processor configured to fit the quadratic model to the road segmentation is further configured to:

select a pixel in the road mask as an initial seed point;

perform the second region growing process on the road mask to iteratively expand the initial seed point into a grown region by adding neighboring pixels around the initial seed point;

refine one or more depth values in the grown region using the stereo depth error model; and fit the quadratic model to the grown region with the refined one or more depth values to generate the refined quadratic road model.

17. The system of claim 16, wherein the at least one processor configured to generate the road surface height grid is further configured to calculate a road surface height value with the refined quadratic road model at one or more points that correspond to the at least one portion of the road segmentation.

18. The system of claim 13, wherein the at least one processor configured to determine the height estimation of the at least one of the non-road stixel representations is further configured to:

determine a location in a scene of the depth map corresponding to the at least one of the non-road stixel representations in the depth map;

determine the height estimation of the at least one of the non-road stixel representations at the location in the scene corresponding to the at least one of the non-road stixel representations; and determine whether the height estimation of the at least one of the non-road stixel representations exceeds a height threshold and whether the at least one of the non-road stixel representations is connected to ground via other non-road stixel representations, wherein the at least one of the non-road stixel representations is identified as an overhead obstacle when the height estimation of the one of the non-road stixel representations exceeds the height threshold and the at least one of the non-road stixel representations is not connected to ground via other non-road stixel representations.

19. The system of claim 13, wherein the at least one processor configured to provide the indication of the height clearance estimate is further configured to:

project the height estimation of the one of the non-road stixel representations into one or more cells of a probabilistic occupancy grid, wherein the probabilistic occupancy grid comprises a plurality of cells with each cell indicating a probability that an overhead obstacle is present in the cell; and determine the height clearance estimate by subtracting the height estimation of the one of the non-road stixel representations in a cell of the probabilistic occupancy grid from a height of the cell, wherein the cell of the probabilistic occupancy grid indicates a value representing the height clearance estimate.

20. A vehicle, comprising:

a first camera;

a second camera; and a processor configured to:

obtain stereo images from the first camera and the second camera;

generate a depth map based on a disparity between the stereo images;

generate an initial road segmentation by performing a gradient-based graph search on the depth map;

generate a stereo depth error model to fit a refined quadratic road model to the initial road segmentation with a region-growing process driven by the stereo depth error model;

determine a road surface height grid with each cell of the road surface height grid indicating road surface height information for a corresponding portion of the initial road segmentation;

segment the depth map into a plurality of stixel representations; and determine a height clearance based on the road surface height information using a probabilistic occupancy grid indicating one or more stixel representations representing an overhead obstacle from the plurality of stixel representations.

* * * * *